(12) United States Patent
Warren

(10) Patent No.: US 6,690,667 B1
(45) Date of Patent: Feb. 10, 2004

(54) SWITCH WITH ADAPTIVE ADDRESS LOOKUP HASHING SCHEME

(75) Inventor: Dean Warren, Carlton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/452,283

(22) Filed: Nov. 30, 1999

(51) Int. Cl.[7] ............................................. H04L 12/56
(52) U.S. Cl. ................... 370/389; 370/395.32; 711/216
(58) Field of Search .................... 370/389, 390, 370/392, 395.3, 395.31, 395.32, 400, 401, 428, 429, 252; 709/245, 238; 711/216, 217, 218, 221; 714/781, 759

(56) References Cited

U.S. PATENT DOCUMENTS

| | | | |
|---|---|---|---|
| 4,588,985 A | | 5/1986 | Carter et al. .................. 341/95 |
| 4,897,785 A | | 1/1990 | Ziiger ......................... 711/216 |
| 5,032,987 A | | 7/1991 | Border et al. ................ 711/221 |
| 5,083,265 A | | 1/1992 | Valiant ......................... 712/21 |
| 5,406,278 A | | 4/1995 | Graybill et al. ................ 341/51 |
| 5,414,704 A | * | 5/1995 | Spinney ....................... 370/389 |
| 5,623,545 A | | 4/1997 | Childs et al. .................. 380/2 |
| 5,713,001 A | | 1/1998 | Eberhard et al. ........... 711/216 |
| 5,920,900 A | * | 7/1999 | Poole et al. ................. 711/216 |
| 6,034,958 A | * | 3/2000 | Wicklund .............. 370/395.32 |
| 6,134,597 A | * | 10/2000 | Rieth et al. .................. 709/237 |
| 6,226,629 B1 | * | 5/2001 | Cossock ......................... 707/3 |
| 6,246,686 B1 | * | 6/2001 | Ha-Duong et al. ...... 370/395.3 |
| 6,424,650 B1 | * | 7/2002 | Yang et al. .................. 370/390 |

* cited by examiner

Primary Examiner—Kenneth Vanderpuye
Assistant Examiner—Brian Nguyen
(74) Attorney, Agent, or Firm—Seth Z. Kalson

(57) ABSTRACT

An Ethernet switch using a hash table for address lookup. The hash function is based upon taking a slice of the coefficients of a remainder polynomial obtained after dividing the sum of an address polynomial and a shifted key polynomial by a cyclic redundancy check (CRC) polynomial. The hash table has multiple buckets for each hash table address. The switch may adaptively choose different CRC polynomials for polynomial division or different slices of the remainder polynomials to reduce bucket leakage.

22 Claims, 4 Drawing Sheets

SWITCH WITH ADAPTIVE ADDRESS LOOKUP HASHING SCHEME

FIELD

The present invention relates to networking technology, and more particularly, to network switches.

BACKGROUND

In a digital communication system, a local area network (LAN) may be connected to another LAN by way of a switch (bridge). LANs are typically packet-based, in which messages are broken into packets (frames). Many LANs are based on IEEE (Institute of Electrical and Electronic Engineers) standard 802.3, commonly called Ethernet. FIG. 1 illustrates four-port switch 102 connecting four Ethernet segments 104, 106, 108, and 110. Each Ethernet segment may be operated at different speeds. For example, segment 102 may be a 10 Mbit Ethernet whereas the other segments may be 100 Mbit Ethernets. Connected to each Ethernet segment are various data terminal equipment (DTE), which may be clients, servers, or other users and creators of digital data. Each DTE has one or more media access control (MAC) devices connected to an Ethernet segment, where each MAC has a unique address.

An Ethernet packet (frame) along with some of its fields is illustrated in FIG. 2. Shown are destination address field 202, source address field 204, frame check sequence field 206, and preamble field 208. The payload data for the Ethernet packet of FIG. 2 is indicated by 210. Not all of the fields are shown. The source address field of an Ethernet packet provides the address of the MAC source of the packet, and the destination address field provides the MAC address of the packet's intended recipient.

Switch 102 forwards or filters a packet based upon the packet's source and destination address fields. For example, if the source of a data packet is DTE 112 and its destination is DTE 114, then switch 102 filters out the data packet, i.e., it is not forwarded to another Ethernet segment. However, if the source of a data packet is DTE 112 and its destination is DTE 116, then the packet is forwarded to Ethernet segment 108.

Usually, a table is accessed by switch 102 to determine whether a packet is forwarded or filtered. Given an address, a table entry provides the segment (or equivalently, the switch port connected to the segment) containing the address, provided the table entry is present in the table. Additional information stored in the table may be the age of the address entry, so that updates based upon age may be performed. The table is built up through a learning process. For example, by observing the source addresses of data packets, switch 102 learns which segments have which MAC addresses. If a data packet is received in which its destination address is not present in a table, switch 102 floods the network with the data packet, i.e., it is forwarded to all segments.

A table may be implemented by a content addressable memory (CAM), whereby an address is matched with stored addresses, and if there is a hit, the appropriate information, such as a switch port, is retrieved. Data structures (or abstract data types) other than tables may be used to associate addresses with segments (switch ports). For example, binary trees, or Patricia trees, may be utilized. However, MAC addresses are 48 bits, and typically a design goal is to provide a capacity of 8 K addresses. Prior techniques of utilizing CAMs and trees may be costly in terms of silicon area or speed. The present invention is motivated to address some or all of these problems.

SUMMARY

In one embodiment of the present invention, a switch comprises a memory unit to store a hash table having entries. Each entry in the hash table is pointed to by a hash table address, and has an address field to indicate an address and a switch port field to indicate a switch port. The hash table address is a portion of the coefficients of a remainder polynomial obtained by dividing the polynomial sum of an address polynomial and a shifted key polynomial by a generator polynomial.

DESCRIPTION OF EMBODIMENTS

Figure 1:
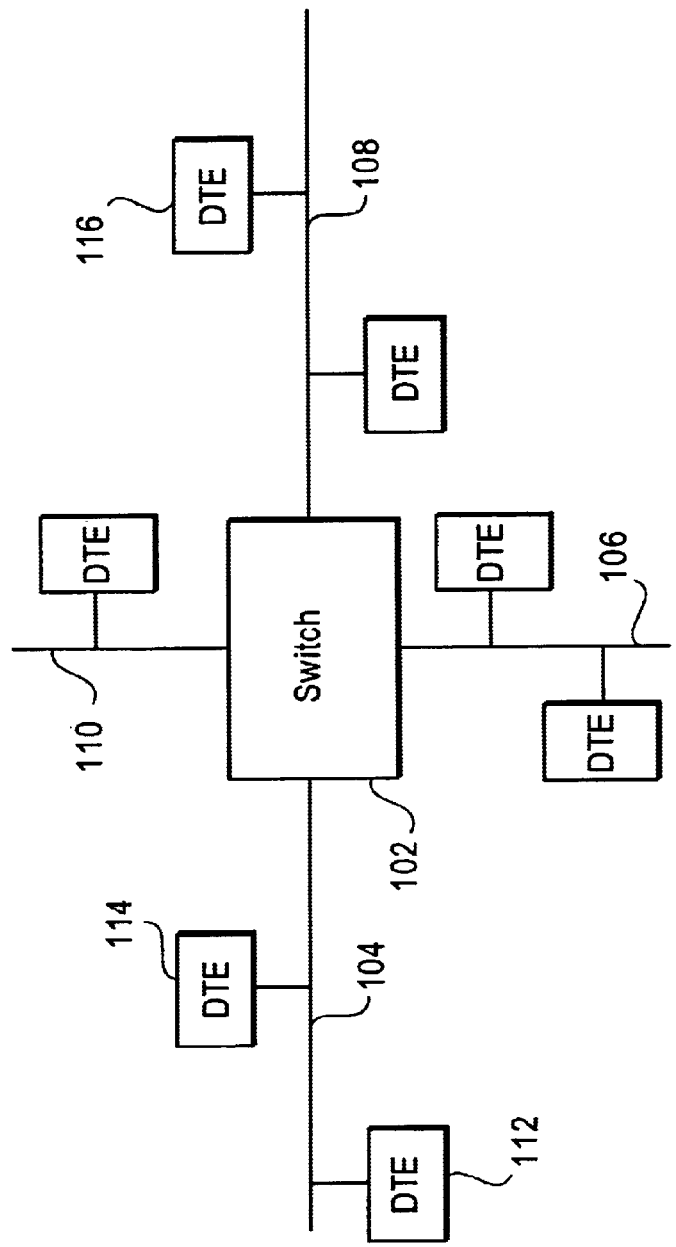
FIG. 1 illustrates a four port switch connecting four Ethernet segments.
Figure 2:
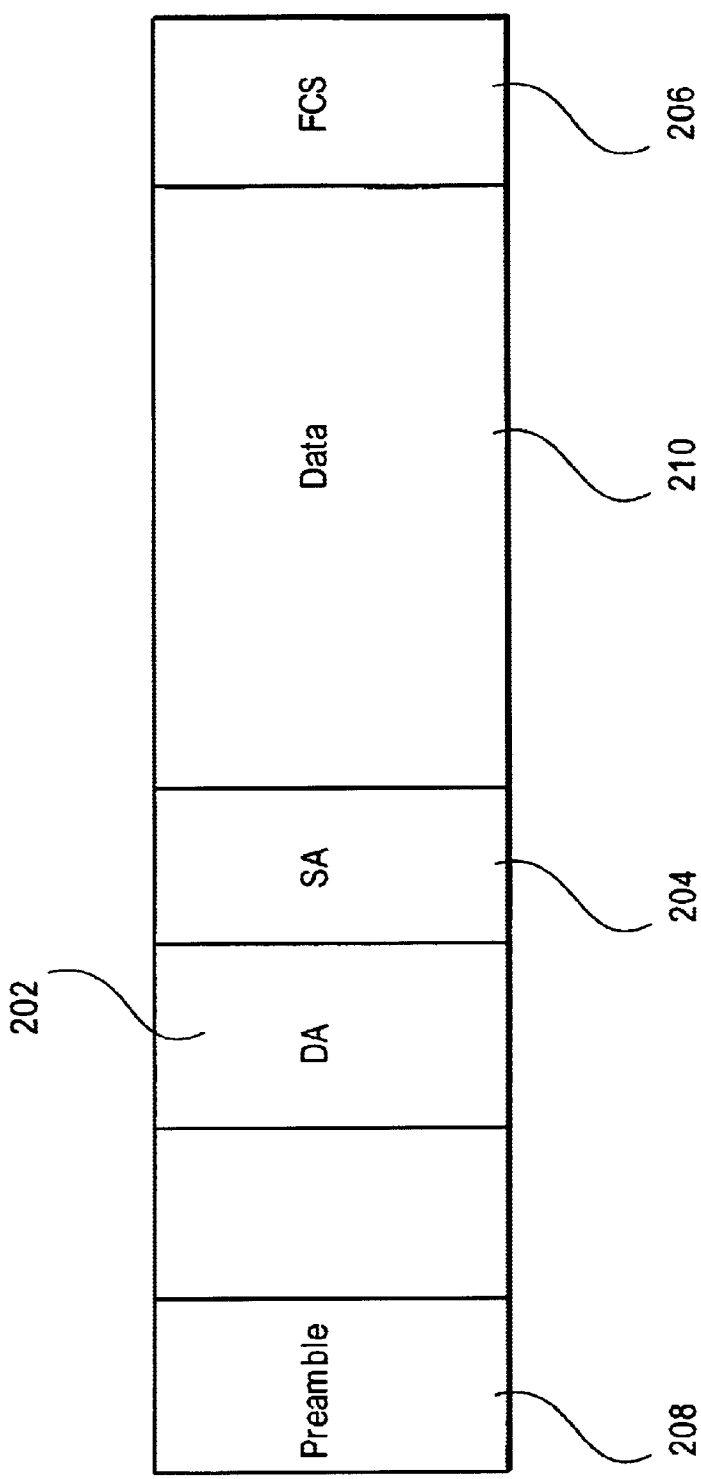
FIG. 2 illustrates part of an Ethernet packet format.

Embodiments of the present invention utilize a hash table to associate MAC addresses with switch ports (segments). A hash table uses a hash function to map a MAC address (or in general any sequence of bits) into a hash table address or index. The range of hash table addresses or indices is usually much less than the range of MAC addresses. A collision occurs when a MAC address hashes to a hash table address in which another MAC address has already been hashed. Embodiments of the present invention utilize a hash table with buckets to resolve collisions.

Hash functions for the disclosed embodiments are based upon using generator polynomials. In preferred embodiments, a cyclic redundancy check (CRC) polynomial is chosen. A CRC polynomial is a generator polynomial used to provide a cyclic code. Although coding is not the subject under discussion, it is found that using CRC polynomials leads to good hash functions. A good hash function has the property by which sequences of MAC addresses are mapped into hash table addresses that appear randomly chosen.

A hashing function for embodiments of the present invention may be described as follows. Let $g(x)$ denote a generator CRC polynomial of degree L, where $$g(x) = g_L x^L + \ldots + g_1 x + g_0.$$

Represent an (M+1) bit MAC address $(\alpha_m, \ldots, \alpha_1, \alpha_0)$ by the polynomial $\alpha(x)$, where $$\alpha(x) = \alpha_M x^M + \ldots + \alpha_1 x + \alpha_0.$$

Let $r(x)$ denote a polynomial of degree not greater than L−1 given as the remainder polynomial after dividing the polynomial $[k(x)x^{M+} + \alpha(x)]$ by $g(x)$, where $k(x)$ is a polynomial (which may be zero) and is referred to as a key. That is, $$r(x) = \text{Remainder}\left[\frac{k(x)x^{M+1} + a(x)}{g(x)}\right].$$

The hash table address is obtained from a subset of the coefficients of $r(x)$, where the subset need not necessarily be a proper subset. As one example, the hash table address is a slice of n consecutive coefficients of $r(x)$.

It is well known that the above remainder may be performed by an LFSR (Linear Feedback Shift Register), where the tap weights of the LFSR depend upon g(x). If k(x) is of degree L−1, then the above remainder may be implemented by the LFSR by first loading the register cells of the LFSR with coefficients from the key polynomial k(x), followed by shifting the coefficients from the polynomial α(x) into the LFSR.

After M+1 shifts, the remainder is given by the values in the register cells of the LFSR. See, for example, *Theory and Practice of Error Control Codes*, Richard E. Blahut, Addison-Wesley Publishing Company.

Two generator polynomials that are found to provide good hashing functions are the CRC32 standard Ethernet 32 bit CRC polynomial (see IEEE 802.3 standard) and the CCITT16 standard CCITT (International Consultative Committee on Telegraph and Telephony) 16 bit CRC. The generator or divisor polynomial associated with CRC32 is the 104C11DB7 polynomial whereas the generator polynomial associated with the CCITT16 standard 16 bit CRC is the 1021 polynomial. (For an xxxxx polynomial, the binary number obtained from the coefficients of the xxxxx polynomial equal the hexadecimal number 1xxxxx.) For both standards, the key polynomial is FFFF (Hex). The CRC32 based hash function maps a 48 bit MAC address into a 32 bit remainder, and the CCITT16 based hash function maps a 48 bit MAC address into a 16 bit remainder.

For a given address polynomial associated with a MAC address, the remainder may be obtained by a parallel XOR tree involving the MAC address bits (the coefficients of the address polynomial). The number of XOR terms in the computation of a coefficient of the remainder polynomial r(x) may be minimized by possibly including a logical 1, where the possible presence of the logical 1 depends upon the key polynomial. The XOR terms for the $i^{th}$ coefficient $r_i$ of the remainder polynomial r(x) may be expressed as $$r_i = \left[\sum_{j \in I(i)} a_j\right] \oplus A_i,$$

where I(i) denotes a set of indices in the range [0, M], $A_i$, is a Boolean variable (a logical "1" or "0"), the above summation symbol is interpreted as an exclusive OR (XOR), and $\oplus$ denotes an XOR. Note that in the above expression for $r_i$, the term "$\oplus A_i$" may be left out if $A_i=0$.

Figure 3:
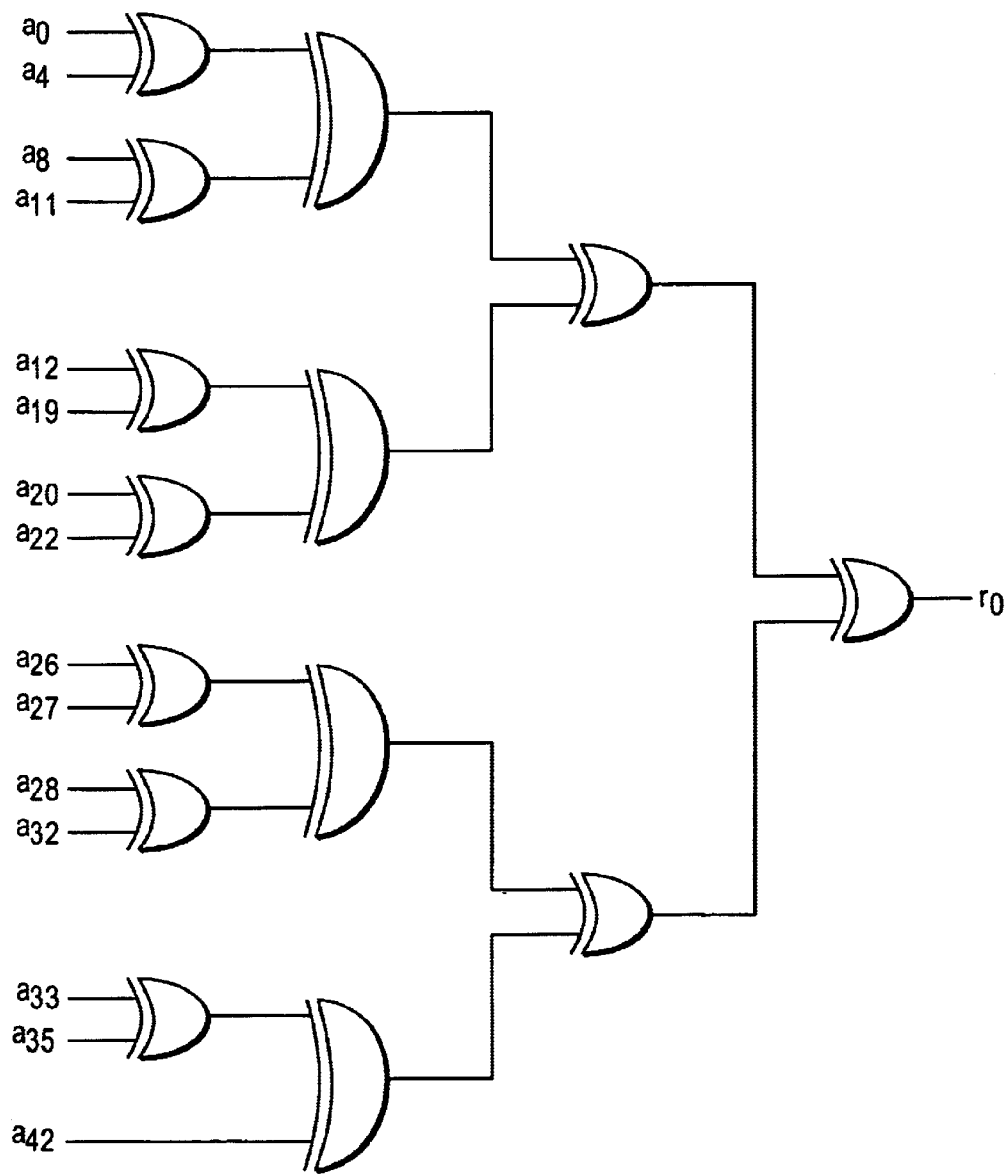
FIG. 3 provides an XOR tree according to an embodiment of the present invention.

In an XOR tree, each remainder coefficient may be obtained independently of the other remainder coefficients, so that all coefficients may be obtained in a single clock cycle in a parallel fashion. For 48 bit MAC addresses, this method for computing remainder coefficients is usually faster than obtaining the coefficients from a linear feedback shift register. Computing I(i) and $A_i$ for a given CRC generator polynomial and given key polynomial may be done by performing polynomial division using an arbitrary address polynomial α(x) and inspecting the remainder polynomial. Tables 1 and 2 provide I(i) and $A_i$ for the CCITT16 and CRC32 polynomials, respectively. Entries in the first columns in the tables denote remainder coefficients. For example, in table 1, CCITT16(i) for i=0, 1, . . . , 15, denotes $r_i$ for a CCITT16 polynomial, and in table 2, CRC32(i) for i=0, 1, . . . , 15, denotes $r_i$ for a CRC32 polynomial. The numerical entries without quotes in a table row denote the set I(i), whereas the last entry, if present, consisting of a '1' in a table row indicates whether a logical 1 is included in the XOR sum to evaluate the remainder coefficient. For example, an XOR tree for evaluating the zeroth remainder coefficient $r_0$ for the CCITT16 polynomial may be read from the first row of table 1 and is illustrated in FIG. 3.

TABLE 1

CRC-CCITT XOR Tree

| | | | | | | | | | | | | | | | | | | | | | | | |
|---|---|---|---|---|---|---|---|---|---|---|---|---|---|---|---|---|---|---|---|---|---|---|---|
| CRC-CCITT(0)  | 0 | 4 | 8  | 11 | 12 | 19 | 20 | 22 | 26 | 27 | 28 | 32 | 33 | 35 | 42 |    |    |    |    |    |    |    |    |
| CRC-CCITT(1)  | 1 | 5 | 9  | 12 | 13 | 20 | 21 | 23 | 27 | 28 | 29 | 33 | 34 | 36 | 43 |    |    |    |    |    |    |    |    |
| CRC-CCITT(2)  | 2 | 6 | 10 | 13 | 14 | 21 | 22 | 24 | 28 | 29 | 30 | 34 | 35 | 37 | 44 |    |    |    |    |    |    |    |    |
| CRC-CCITT(3)  | 3 | 7 | 11 | 14 | 15 | 22 | 23 | 25 | 29 | 30 | 31 | 35 | 36 | 38 | 45 |    |    |    |    |    |    |    |    |
| CRC-CCITT(4)  | 4 | 8 | 12 | 15 | 16 | 23 | 24 | 26 | 30 | 31 | 32 | 36 | 37 | 39 | 46 | '1' |   |    |    |    |    |    |    |
| CRC-CCITT(5)  | 0 | 4 | 5  | 8  | 9  | 11 | 12 | 13 | 16 | 17 | 19 | 20 | 22 | 24 | 25 | 26 | 28 | 31 | 35 | 37 | 38 | 40 | 42 | 47 |
| CRC-CCITT(6)  | 1 | 5 | 6  | 9  | 10 | 12 | 13 | 14 | 17 | 18 | 20 | 21 | 23 | 25 | 26 | 27 | 29 | 32 | 36 | 38 | 39 | 41 | 43 |    |
| CRC-CCITT(7)  | 2 | 6 | 7  | 10 | 11 | 13 | 14 | 15 | 18 | 19 | 21 | 22 | 24 | 26 | 27 | 28 | 30 | 33 | 37 | 39 | 40 | 42 | 44 |    |
| CRC-CCITT(8)  | 3 | 7 | 8  | 11 | 12 | 14 | 15 | 16 | 19 | 20 | 22 | 23 | 25 | 27 | 28 | 29 | 31 | 34 | 38 | 40 | 41 | 43 | 45 |    |
| CRC-CCITT(9)  | 4 | 8 | 9  | 12 | 13 | 15 | 16 | 17 | 20 | 21 | 23 | 24 | 26 | 28 | 29 | 30 | 32 | 35 | 39 | 41 | 42 | 44 | 46 | '1' |
| CRC-CCITT(10) | 5 | 9 | 10 | 13 | 14 | 16 | 17 | 18 | 21 | 22 | 24 | 25 | 27 | 29 | 30 | 31 | 33 | 36 | 40 | 42 | 43 | 45 | 47 | '1' |
| CRC-CCITT(11) | 6 | 10| 11 | 14 | 15 | 17 | 18 | 19 | 22 | 23 | 25 | 26 | 28 | 30 | 31 | 32 | 34 | 37 | 41 | 43 | 44 | 46 | '1' |    |
| CRC-CCITT(12) | 0 | 4 | 7  | 8  | 15 | 16 | 18 | 22 | 23 | 24 | 28 | 29 | 31 | 38 | 44 | 45 | 47 |    |    |    |    |    |    |    |
| CRC-CCITT(13) | 1 | 5 | 8  | 9  | 16 | 17 | 19 | 23 | 24 | 25 | 29 | 30 | 32 | 39 | 45 | 46 |    |    |    |    |    |    |    |    |
| CRC-CCITT(14) | 2 | 6 | 9  | 10 | 17 | 18 | 20 | 24 | 25 | 26 | 30 | 31 | 33 | 40 | 46 | 47 |    |    |    |    |    |    |    |    |

TABLE 1-continued

CRC-CCITT XOR Tree

| CRC-CCITT(15) | 3 | 7 | 10 | 11 | 18 | 19 | 21 | 25 | 26 | 27 | 31 | 32 | 34 | 41 | 47 |
|---|---|---|---|---|---|---|---|---|---|---|---|---|---|---|---|

TABLE 2

CRC-32 XOR Tree

| | | | | | | | | | | | | | | | | | | | | | | | |
|---|---|---|---|---|---|---|---|---|---|---|---|---|---|---|---|---|---|---|---|---|---|---|---|
| CRC-32(0) | 2 | 15 | 14 | 12 | 8 | 16 | 31 | 30 | 28 | 27 | 26 | 25 | 24 | 38 | 35 | 44 | 43 | 41 | 40 | '1' | | | |
| CRC-32(1) | 3 | 0 | 15 | 13 | 9 | 17 | 16 | 31 | 29 | 28 | 27 | 26 | 25 | 39 | 36 | 45 | 44 | 42 | 41 | '1' | | | |
| CRC-32(2) | 4 | 1 | 0 | 14 | 10 | 18 | 17 | 16 | 30 | 29 | 28 | 27 | 26 | 24 | 37 | 46 | 45 | 43 | 42 | 40 | | | |
| CRC-32(3) | 5 | 2 | 1 | 15 | 11 | 19 | 18 | 17 | 31 | 30 | 29 | 28 | 27 | 25 | 38 | 47 | 46 | 44 | 43 | 41 | | | |
| CRC-32(4) | 6 | 3 | 2 | 0 | 12 | 20 | 19 | 18 | 16 | 31 | 30 | 29 | 28 | 26 | 39 | 32 | 47 | 45 | 44 | 42 | | | |
| CRC-32(5) | 7 | 4 | 3 | 1 | 13 | 21 | 20 | 19 | 17 | 16 | 31 | 30 | 29 | 27 | 24 | 33 | 32 | 46 | 45 | 43 | 40 | '1' | |
| CRC-32(6) | 5 | 4 | 15 | 12 | 8 | 22 | 21 | 20 | 18 | 17 | 27 | 26 | 24 | 38 | 35 | 34 | 33 | 47 | 46 | 43 | | | |
| CRC-32(7) | 6 | 5 | 0 | 13 | 9 | 23 | 22 | 21 | 19 | 18 | 28 | 27 | 25 | 39 | 36 | 35 | 34 | 32 | 47 | 44 | 40 | '1' | |
| CRC-32(8) | 7 | 6 | 1 | 14 | 10 | 8 | 23 | 22 | 20 | 19 | 29 | 28 | 26 | 24 | 37 | 36 | 35 | 33 | 32 | 45 | 41 | 40 | '1' |
| CRC-32(9) | 7 | 14 | 12 | 11 | 9 | 23 | 21 | 20 | 16 | 31 | 29 | 28 | 26 | 24 | 37 | 36 | 35 | 34 | 33 | 46 | 44 | 43 | 42 | 40 |
| CRC-32(10) | 2 | 14 | 13 | 10 | 22 | 21 | 17 | 31 | 29 | 28 | 26 | 24 | 37 | 36 | 34 | 47 | 45 | | | | | | |
| CRC-32(11) | 3 | 15 | 14 | 11 | 23 | 22 | 18 | 16 | 30 | 29 | 27 | 25 | 38 | 37 | 35 | 32 | 46 | | | | | | |
| CRC-32(12) | 4 | 0 | 15 | 12 | 8 | 23 | 19 | 17 | 31 | 30 | 28 | 26 | 39 | 38 | 36 | 33 | 47 | 40 | | | | | |
| CRC-32(13) | 5 | 1 | 0 | 13 | 9 | 8 | 20 | 18 | 16 | 31 | 29 | 27 | 24 | 39 | 37 | 34 | 32 | 41 | '1' | | | | |
| CRC-32(14) | 6 | 2 | 1 | 14 | 10 | 9 | 21 | 19 | 17 | 16 | 30 | 28 | 25 | 24 | 38 | 35 | 33 | 42 | 40 | | | | |
| CRC-32(15) | 7 | 3 | 2 | 15 | 11 | 10 | 22 | 20 | 18 | 17 | 31 | 29 | 26 | 25 | 39 | 36 | 34 | 43 | 41 | 40 | '1' | | |
| CRC-32(16) | 4 | 3 | 2 | 0 | 15 | 14 | 11 | 8 | 23 | 21 | 19 | 18 | 31 | 28 | 25 | 38 | 37 | 43 | 42 | | | | |
| CRC-32(17) | 5 | 4 | 3 | 1 | 0 | 15 | 12 | 9 | 8 | 22 | 20 | 19 | 16 | 29 | 26 | 39 | 38 | 44 | 43 | '1' | | | |
| CRC-32(18) | 6 | 5 | 4 | 2 | 1 | 0 | 13 | 10 | 9 | 23 | 21 | 20 | 17 | 30 | 27 | 24 | 39 | 45 | 44 | 40 | | | |
| CRC-32(19) | 7 | 6 | 5 | 3 | 2 | 1 | 14 | 11 | 10 | 8 | 22 | 21 | 18 | 31 | 28 | 25 | 24 | 46 | 45 | 41 | 40 | | |
| CRC-32(20) | 7 | 6 | 4 | 3 | 14 | 11 | 9 | 8 | 23 | 22 | 19 | 31 | 30 | 29 | 28 | 27 | 24 | 38 | 35 | 47 | 46 | 44 | 43 | 42 | 40 |
| CRC-32(21) | 7 | 5 | 4 | 2 | 14 | 10 | 9 | 23 | 20 | 29 | 27 | 26 | 24 | 39 | 38 | 36 | 35 | 32 | 47 | 45 | | | |
| CRC-32(22) | 6 | 5 | 3 | 2 | 14 | 12 | 11 | 10 | 21 | 16 | 31 | 26 | 39 | 38 | 37 | 36 | 35 | 33 | 32 | 46 | 44 | 43 | 41 | 40 | '1' |
| CRC-32(23) | 7 | 6 | 4 | 3 | 15 | 13 | 12 | 11 | 22 | 17 | 16 | 27 | 24 | 39 | 38 | 37 | 36 | 34 | 33 | 47 | 45 | 44 | 42 | 41 | '1' |
| CRC-32(24) | 7 | 5 | 4 | 2 | 0 | 15 | 13 | 8 | 23 | 18 | 17 | 16 | 31 | 30 | 27 | 26 | 39 | 37 | 34 | 32 | 46 | 45 | 44 | 42 | 41 | 40 | '1' |
| CRC-32(25) | 6 | 5 | 3 | 2 | 1 | 0 | 15 | 12 | 9 | 19 | 18 | 17 | 30 | 26 | 25 | 33 | 47 | 46 | 45 | 44 | 42 | 40 | | |
| CRC-32(26) | 7 | 6 | 4 | 3 | 2 | 1 | 0 | 13 | 10 | 20 | 19 | 18 | 31 | 27 | 26 | 34 | 32 | 47 | 46 | 45 | 43 | 41 | | |
| CRC-32(27) | 7 | 5 | 4 | 3 | 1 | 15 | 12 | 11 | 8 | 21 | 20 | 19 | 31 | 30 | 26 | 25 | 24 | 38 | 33 | 32 | 47 | 46 | 43 | 42 | 41 | 40 |
| CRC-32(28) | 6 | 5 | 4 | 0 | 15 | 14 | 13 | 9 | 8 | 22 | 21 | 20 | 30 | 28 | 24 | 39 | 38 | 35 | 34 | 33 | 32 | 47 | 42 | '1' |
| CRC-32(29) | 7 | 6 | 5 | 1 | 0 | 15 | 14 | 10 | 9 | 23 | 22 | 21 | 31 | 29 | 25 | 24 | 39 | 36 | 35 | 34 | 33 | 32 | 43 | '1' |
| CRC-32(30) | 7 | 6 | 1 | 0 | 14 | 12 | 11 | 10 | 23 | 22 | 31 | 28 | 27 | 38 | 37 | 36 | 34 | 33 | 43 | 41 | 40 | | | |
| CRC-32(31) | 7 | 1 | 14 | 13 | 11 | 23 | 31 | 30 | 29 | 27 | 26 | 25 | 24 | 39 | 37 | 34 | 43 | 42 | 40 | '1' | | | |

In one embodiment, 13 consecutive bits of the remainder coefficients are used to index into a hash table, whereas in other embodiments, some subset of the remainder polynomial coefficients may be used. Various collision policies may be used to resolve collisions in the hash table. In one embodiment, a hash table with buckets is employed.

Figure 4:
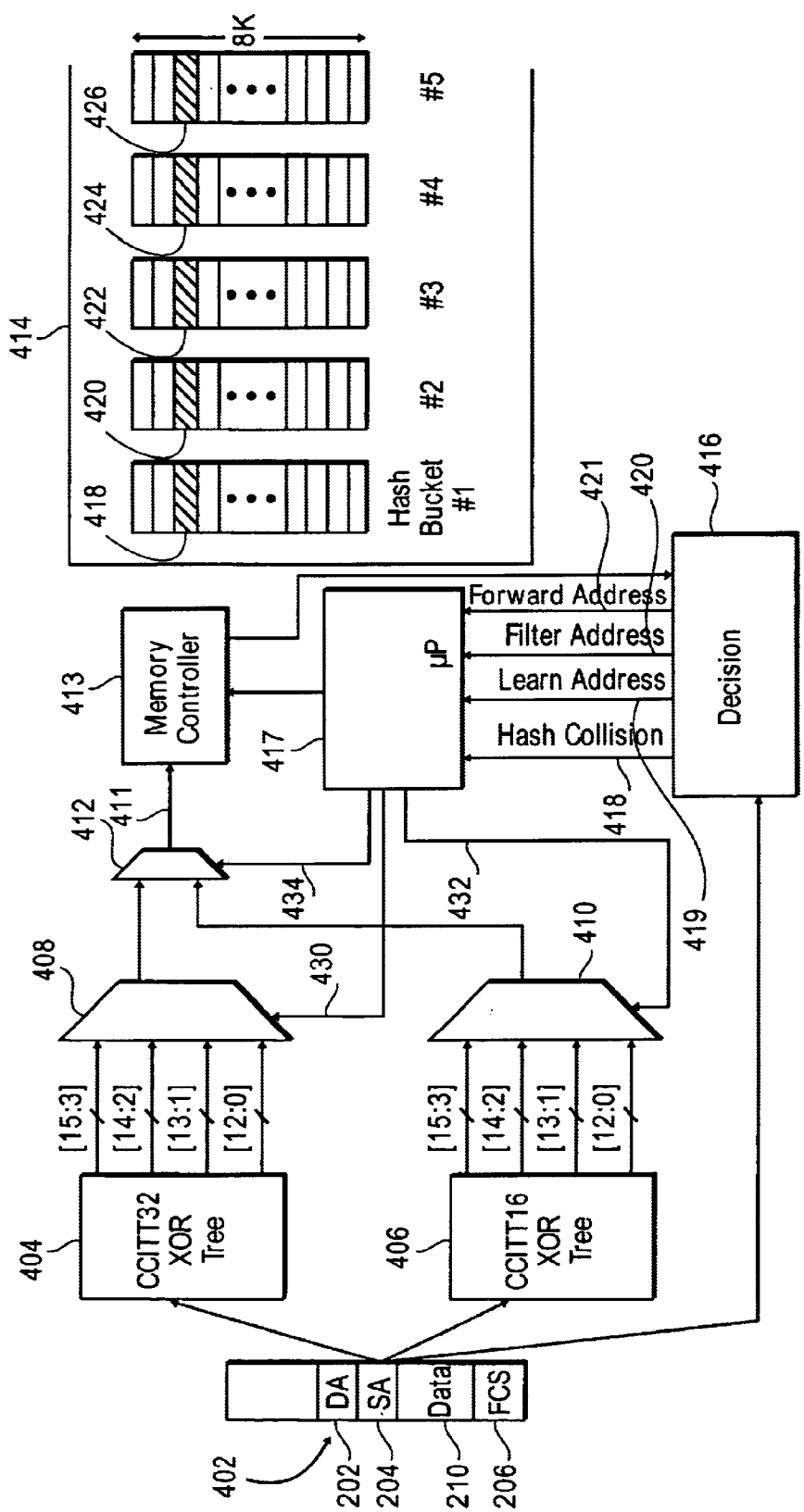
FIG. 4 provides a functional level diagram of an embodiment of the present invention.

FIG. 4 provides an embodiment of the present invention utilizing a 13 bit hash table address to index into a hash table with five buckets, where the 13 bit hash table address is comprised of 13 consecutive bits (a slice) from a remainder polynomial after polynomial division by either a CRC32 polynomial or a CCITT16 polynomial.

In FIG. 4, a 48 bit MAC address from Ethernet packet 402 is provided to CRC32 XOR tree 404 and CCITT16 XOR tree 406. The MAC address is the source address 204 if the switch is in a learning mode, whereas it is the destination address 202 otherwise. Each XOR tree provides four 13 bit slices of their respective 32 and 16 bit remainder polynomial coefficients. Multiplexer (selector) 408 selects one of the four 13 bit slices from XOR tree 404 and multiplexer 410 selects one of the four 13 bit slices from XOR tree 406. Multiplexer 412 selects one of the two 13 bit slices provided by multiplexers 408 and 410 as the hash table address. Memory controller 413 accesses memory unit 414 based upon the hash table address. Memory unit 414 stores the hash table.

The hash table is illustrated by five buckets, each having 8 K entries, where each entry is used to store a 48 bit address, as well as other associated information. A hash table address value is used to point to a unique entry in one or more buckets of the hash table. In one embodiment, parallel processing is employed so that entries in each bucket may be examined concurrently. For example, a hash table address may point to entries 418, 420, 422, 424, and 426.

Decision functional unit 416 compares addresses stored in the hash table with the MAC address from Ethernet packet 402. Provided the destination MAC address from Ethernet packet 402 is in the hash table, decision functional unit 416 filters or forwards Ethernet packet 402 depending upon the information stored in the hash table. If the destination MAC address is not in the hash table, the packet is flooded to all ports. Decision functional unit 416 also provides various signals to microprocessor 417, such as hash collision signal 418 to indicate whether there is a collision, learn address signal 419 to indicate a learning mode, filter address signal 420 to indicate that packet 402 is filtered, and forward address signal 421 to indicate that packet 402 is forwarded.

More specifically, suppose the MAC address is the destination address 202. Entries in the hash buckets corresponding to the hash table address on signal line 411 are compared to the MAC address by decision functional unit 416. If a valid entry has an address that matches the MAC address, then the segment information (or switch port) is retrieved from the entry and used to determine if forwarding or filtering is to be employed. If none of the entries in the buckets match the MAC address, then Ethernet packet 402 may be flooded to all other segments.

When in a learning mode, the MAC address is now the source address 204, and the MAC address, along with the segment or switch port from which Ethernet packet 402 was received, is placed in an entry in an empty bucket pointed to by the hash table address on signal line 411. If there are no empty entries, then an entry is chosen to be over-written by the MAC address. The entry chosen to be over-written may be the oldest entry, if there is one. If all entries are of the same age, or if an age characteristic is not incorporated in the data structures of the hash table entries, then an entry may be chosen randomly. An entry may be aged by decrementing an age field each time a pre-determined interval of time elapses. In one embodiment, when an age field reaches zero, the entry is indicated as invalid.

Microprocessor 417 implements a hash collision resolution policy, as well as implements an adaptive method for selecting the hash function. Microprocessor 417 controls multiplexers 408, 410, and 412 via select lines 430, 432, and 434, thereby selecting the particular hash function used. Once a particular selection is made, the hash table stored in memory unit 414 is accessed or built up using the selected hash function. If a new hash function is chosen, then the hash table entries are no longer valid and a new hash table is built.

Once a hash function is selected, microprocessor 417 may select another hash function based upon bucket leakage, whereby bucket leakage refers to the situation in which a given MAC address is hashed into buckets that already contain valid MAC addresses not matching the given MAC address. For example, a different hash function may be selected if the frequency that a hash table address finds all buckets full exceeds a threshold. This frequency may be an average over all hash table addresses. This threshold may be pre-selected, or may itself be adaptive.

The overall hash functional unit may be considered as being implemented by the combination of XOR trees 404 and 406, multiplexers 408, 410, and 412, microprocessor 417, and decision functional unit 416. The functional units in FIG. 4 may be realized by various combinations of firmware, software, and hardware modules. Furthermore, the various functional units shown in FIG. 4 may be realized by a different set of functional units that in combination provide the same overall function as described in relation to FIG. 4. For example, the function of microprocessor 417 may be replaced by a finite state machine programmed by firmware.

Many modifications may be made to the disclosed embodiments without departing from the scope of the invention as claimed below. For example, other differently sized hash tables may be used. Different slices from the remainder polynomials may be selected, or generator polynomials may be selected so that all the coefficients of the remainder polynomials are used, so that it is to be understood in the claims below that a subset of the coefficients of a remainder polynomial may also include all the coefficients. The set of hash functions used for selecting a hash function to index into the hash table may be greater than two.

What is claimed is:

1. A switch comprising:
   a memory unit to store a hash table having entries, wherein each entry is pointed to by a hash table address and has an address field to indicate an address and a switch port field to indicate a switch port;
   wherein a hash table address is a subset of the coefficients of a remainder polynomial r(x), where $$r(x) = \text{Remainder}\left[\frac{k(x)x^{M+1} + a(x)}{g(x)}\right],$$

where $\alpha(x)$ is an address polynomial associated with an address, g(x) is a generator polynomial, and k(x) is a key polynomial where M is an integer.

2. The switch as set forth in claim 1, wherein the generator polynomial is a cyclic redundancy check (CRC) polynomial.

3. The switch as set forth in claim 1, wherein the hash table address is a consecutive sequence of coefficients of the remainder polynomial.

4. The switch as set forth in claim 1, further comprising an XOR tree to provide the remainder polynomial.

5. The switch as set forth in claim 1, wherein the hash table has more than one bucket for each hash table address.

6. The switch as set forth in claim 5, wherein the generator polynomial is a cyclic redundancy check (CRC) polynomial.

7. The switch as set forth in claim 6, further comprising an XOR tree to provide the remainder polynomial.

8. A switch comprising:
   a memory unit to store a hash table having entries, wherein each entry is pointed to by a hash table address and has an Ethernet MAC (media access control) address field to indicate an Ethernet MAC address and a switch port field to indicate a switch port; and
   a hash functional unit to provide a hash function, the hash functional unit comprising:
      at least one polynomial divider functional unit to provide subsets of the coefficients of n remainder polynomials $r_i(x)$, i=0, 1, . . . n−1, where $$r_i(x) = \text{Remainder}\left[\frac{k_i(x)x^{M_i+1} + a(x)}{g_i(x)}\right],$$

where $\alpha(x)$ is an address polynomial associated with a MAC address, $g_i(x)$, i=0, 1, . . . n−1, are n generator polynomials, $k_i(x)$, i=0, 1, . . . n−1, are n key polynomials, and $M_i$, i=0, 1, . . . n−1, are n integers, wherein a hash table address is a subset of the coefficients of a remainder polynomial selected from the n remainder polynomials $r_i(x)$, i=0, 1, . . . n−1.

9. The switch as set forth in claim 8, wherein each generator polynomial is a cyclic redundancy check (CRC) polynomial.

10. The switch as set forth in claim 8, wherein the hash table address is a consecutive sequence of coefficients of the remainder polynomial selected from the n remainder polynomials $r_i(x)$, i=0, 1, . . . n−1.

11. The switch as set forth in claim 8, wherein the at least one polynomial divider functional unit comprises an XOR tree.

12. The switch as set forth in claim 8, wherein the hash table has more than one bucket for each hash table address.

13. The switch as set forth in claim 12, wherein each generator polynomial is a cyclic redundancy check (CRC) polynomial.

14. The switch as set forth in claim 12, wherein the switch selects a hash function based upon bucket leakage.

15. The switch as set forth in claim 14, wherein the switch selects the remainder polynomial from the n remainder polynomials $r_i(x)$, i=0, 1, . . . n−1, based upon bucket leakage.

16. The switch as set forth in claim 14, wherein the switch selects the subset of the coefficients of the selected remainder polynomial based upon bucket leakage.

17. The switch as set forth in claim 8, wherein at least two key polynomials belonging to the set $k_i(x)$, i=0, 1, . . . n-1, are equal to each other.

18. A communication system comprising:
a microprocessor;
system memory to store instructions for the microprocessor;
a switch having first and second ports to forward a frame received at the first port, the frame having a destination address;
a memory unit to store a hash table; and
a first polynomial divider functional unit to provide a hash table address, wherein the hash table address is a first subset of the coefficients of a first remainder polynomial obtained by dividing a polynomial sum of an address polynomial and shifted first key polynomial by a first generator polynomial, wherein the address polynomial corresponds to the destination address;
wherein the switch accesses the hash table to forward the frame to a network segment connected to the second port if the hash table address points to a valid entry in the hash table having an address in an address field matching the destination address and having a switch port in a switch port field matching the second port.

19. The communication system as set forth in claim 18, wherein the hash table has more than one bucket for each hash table address.

20. The communication system as set forth in claim 19, wherein the microprocessor under control of software in the system memory selects, based upon bucket leakage, a second subset of the coefficients of the first remainder polynomial to provide a hash table address or a subset of the coefficients of a second remainder polynomial obtained by dividing a polynomial sum of the address polynomial and a shifted second key polynomial by a second generator polynomial.

21. The communication system as set forth in claim 20, wherein the first and second key polynomials are equal to each other.

22. A switch comprising:
a memory unit to store a hash table having entries, wherein each entry is pointed to by a hash table address and has an address field to indicate an address and a switch port field to indicate a switch port;
at least one XOR tree to directly implement for i=0,1, . . . , L-1

$$r_i = \left[\sum_{j \in I(i)} a_j\right] \oplus A_i,$$

where $\alpha_j$, j=0,1, . . . , M is an address, $A_i$ is a Boolean variable independent of the address $\alpha_j$, j=0,1, . . . , M, the summation $\Sigma$ and $\oplus$ denote XOR, and I(i) denotes a set of indices in the range;
wherein the $A_i$ and I(i) are chosen such that the polynomial r(x), where $$r(x) = r_{L-1}x^{L-1} + \ldots r_1 x + r_0,$$

is the remainder polynomial obtained by dividing $[k(x)x^{M+} + \alpha(x)]$ by a generator polynomial g(x), where $$g(x) = g_L x^L + \ldots g_1 x + g_0,$$

and where k(x) is a key polynomial;
where a hash table address for the address $\alpha_j$, j=0,1, . . . , M is a subset of $r_i$=0,1, . . . , L-1.

* * * * *

UNITED STATES PATENT AND TRADEMARK OFFICE
CERTIFICATE OF CORRECTION

PATENT NO. : 6,690,667 B1
DATED : February 10, 2004
INVENTOR(S) : Warren

It is certified that error appears in the above-identified patent and that said Letters Patent is hereby corrected as shown below:

Column 2,
Line 51, delete "$(\alpha_M,\ldots,\alpha_1,\alpha_0)$" and insert -- $(a_M,\ldots,a_1,a_0)$ --.
Line 52, delete "$\alpha(x)$" and insert -- $a(x)$ --.
Line 54, delete "$\alpha(x) = \alpha_M x^M + \ldots a_1 x + \alpha_0$" and insert -- $a(x) = a_m x^M + \ldots a_1 x + a_0$ --.
Line 57, delete "$[k(x)x^{M+} + \alpha(x)]$" and insert -- $[k(x)x^{M+1} + a(x)]$ --.

Column 3,
Line 7, delete "$\alpha(x)$" and insert -- $a(x)$ --.

Column 8,
Lines 6 and 36, "$\alpha(x)$" and insert -- $a(x)$ --.

Column 10,
Lines 17, 18 and 32, delete "$\alpha_j$" and insert -- $a_j$ --.
Line 20, insert -- [0,M] -- after the word "range".
Lines 26-27, delete "$[k(x)x^{M+} + \alpha(x)]$" and insert -- $[k(x)x^{M+1} + a(x)]$ --.
Line 33, delete "$r_i = 0,1,\ldots, L-1$" and insert -- $r_i, i = 0,1,\ldots, L-1$ --.

Signed and Sealed this

Fifth Day of October, 2004

JON W. DUDAS
*Director of the United States Patent and Trademark Office*